H. H. Bent.
Cheese-Vat.
№ 75515. Patented Mar. 17, 1868.
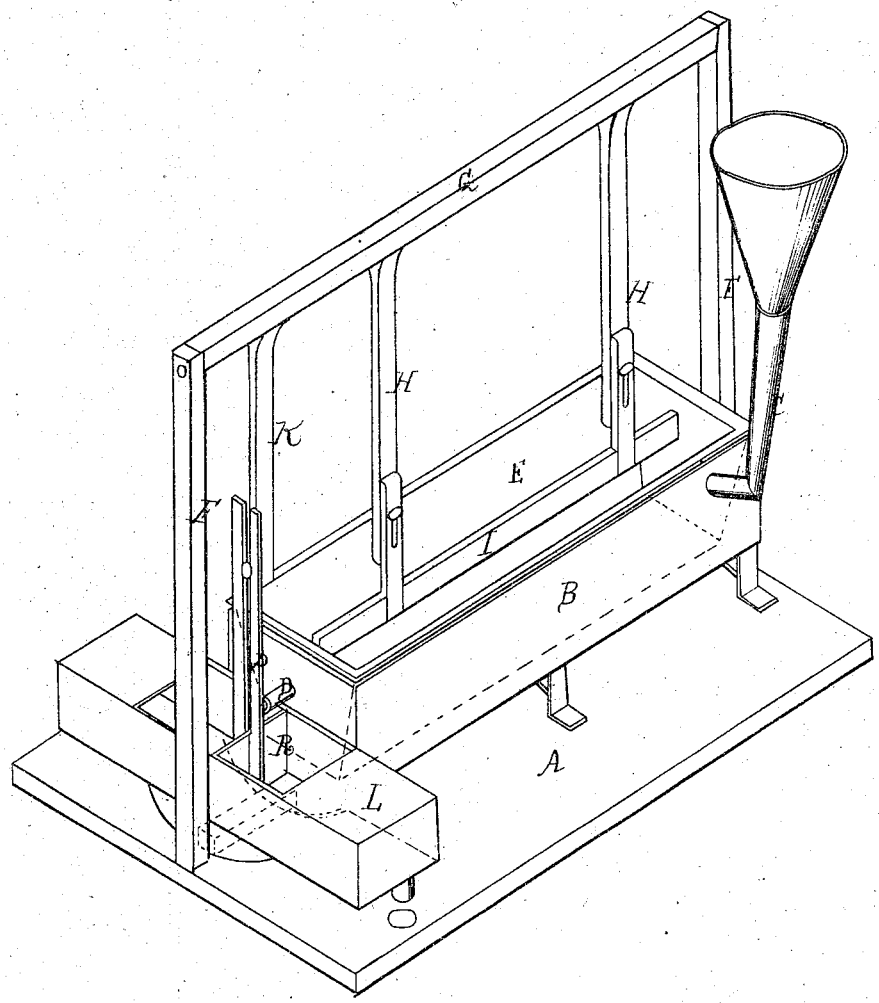
Witnesses
V. D. Stockbridge
C. H. Rhue
Inventor
H. H. Bent
per
Alexander Mason
Atty

H. H. Bent.
Cheese-Vat.
Nº 75515.      Patented Mar. 17, 1868.
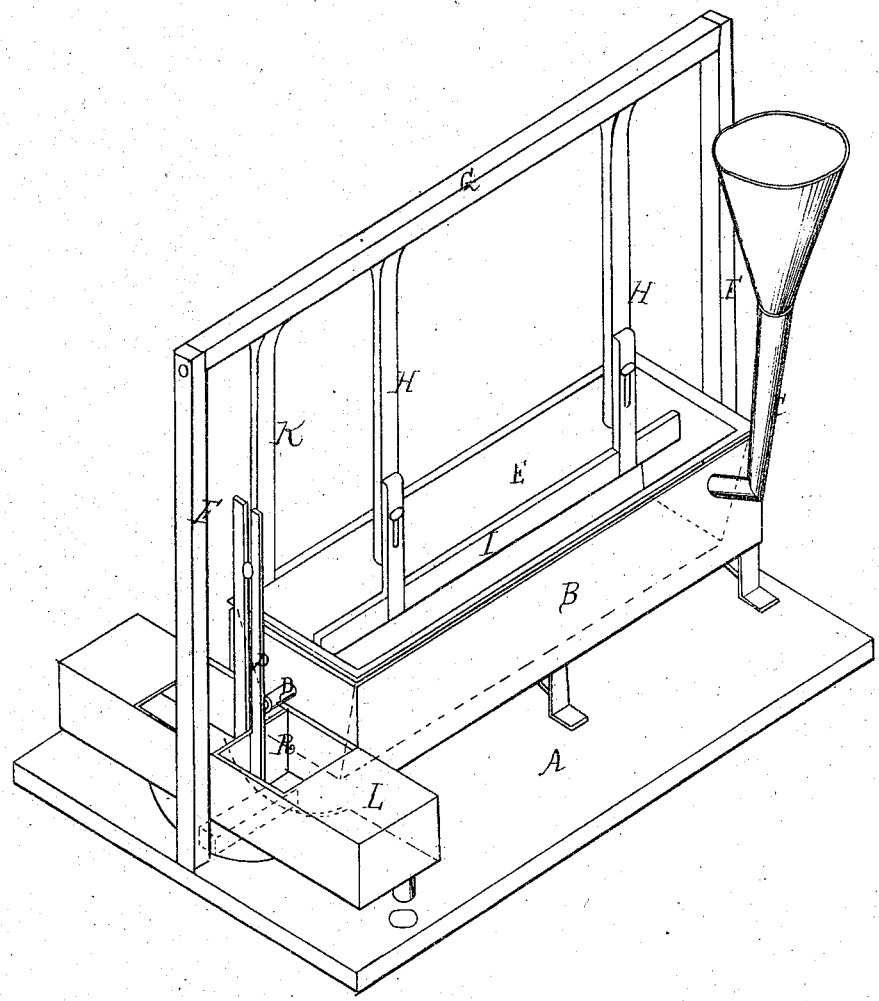
Witnesses
Inventor
H. H. Bent